United States Patent
Chang et al.

(10) Patent No.: US 8,274,322 B2
(45) Date of Patent: Sep. 25, 2012

(54) CHARGE PUMP WITH LOW NOISE AND HIGH OUTPUT CURRENT AND VOLTAGE

(75) Inventors: Meng-Fan Chang, Taichung (TW); Shin-Jang Shen, Zhubei (TW); Wan-Ying Lu, Zhubei (TW)

(73) Assignee: National Tsing Hua University, Hsin Chu (TW)

( * ) Notice: Subject to any disclaimer, the term of this patent is extended or adjusted under 35 U.S.C. 154(b) by 66 days.

(21) Appl. No.: 12/906,313

(22) Filed: Oct. 18, 2010

(65) Prior Publication Data
US 2012/0092054 A1    Apr. 19, 2012

(51) Int. Cl.
    *G05F 1/10* (2006.01)
(52) U.S. Cl. ....................................... 327/536
(58) Field of Classification Search .................. 327/535, 327/536, 537
    See application file for complete search history.

(56) References Cited

U.S. PATENT DOCUMENTS

| 5,140,182 A * | 8/1992 | Ichimura | 327/536 |
| 7,567,118 B2 * | 7/2009 | Azuma et al. | 327/536 |
| 7,605,638 B2 * | 10/2009 | Nagasawa et al. | 327/536 |
| 7,642,837 B2 * | 1/2010 | Ha et al. | 327/536 |

* cited by examiner

*Primary Examiner* — Jeffrey Zweizig
(74) *Attorney, Agent, or Firm* — Chih Feng Yeh; Huntington IP Consulting Co., Ltd.

(57) ABSTRACT

The present invention discloses a charge pump system with low noise and high output current and voltage, comprising: a four phase clock generator used to generate a first signals group; a serial of delay circuits coupled to said four phase clock generator, wherein each of said delay circuits is coupled to a previous delay circuit relative to each of said delay circuits for delaying a signals group received from said previous delay circuit; a first charge pump circuit coupled to the four phase clock generator and the delay circuits; and an output terminal coupled to the first charge pump circuit; wherein high level of said first signal overlaps two sections of high level of said third signal to generate a first overlapping time and a second overlapping time, and said first overlapping time is not equal to said second overlapping time.

20 Claims, 8 Drawing Sheets

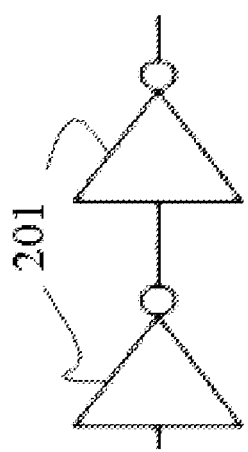
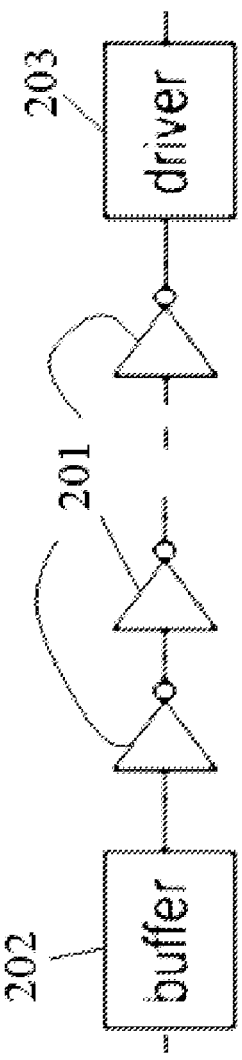
FIG.3a
FIG.3b

CHARGE PUMP WITH LOW NOISE AND HIGH OUTPUT CURRENT AND VOLTAGE

TECHNICAL FIELD

The present invention generally relates to a charge pump, and especially to a charge pump with low noise, high output current and voltage.

DESCRIPTION OF THE RELATED ART

In pace with the development of technology, low-supply voltage is more and more important. An on-chip voltage generator or a multiplier is introduced in the IC with single power supply to generate voltage higher than supply voltage. Generally, the higher voltage is the desired voltage for maintaining the normal function of the IC, and the device which can implement aforementioned features is called a charge pump. A charge pump which can generate positive voltage higher than the supply voltage or negative voltage lower than the supply voltage may widely be used in the field of memory, such as the back bias of the DRAM, programming and erasing of the non-volatile memory (such as OTP (one time programmable read only memory), EEPROM, Flash memory, etc. Take programming of the stake gate of Flash memory as an example, positive high voltage may drive electrons from the control gate to the floating gate by CHE or FN (Flowler-Nordheim) method, which means the accomplishment of programming. The same theory may be used in erasing. When the control gate is coupled to negative high voltage and the source gate is coupled to a positive high voltage, the negative electrons will be drawn from the floating gate to the source gate, which means the accomplishment of erasing.

A charge pump is a DC/DC converter that consists of MOS switches and energy-transfer capacitors in pump stage. Capacitor charge pumps are commonly used for pumping charge upward to produce voltage which is higher than the regular supply voltage or downward to negative voltage on a chip. This structure does not require magnetic components, so it becomes an important circuit technique in lower cost design.

The charge pump widely used is the Dickson' CPC (charge pump circuit). The Dickson' CPC which is based on the Dickson diode connected NMOS structure uses the switched-capacitor circuit to transfer charges in a single way, but it may suffer from the Vth (threshold voltage) of NMOS such that the transferring charges will be reduced. As the voltage on HV (high voltage) path of each stage increases, the Vth increases since the HVNMOS may suffer from body effect. Hence, the voltage gain decreases as the number of stages increases, and then the output voltage may not linearly increase anymore. The efficiency of Dickson's CPC is far from an ideal value because of the voltage drop per stage. To overcome the aforementioned problem of Dickson's CPC, NPC-1 (New charge pump) which utilizes the static CTSs (charge transfer switches) to solve the problem of the voltage drop from the source to the drain is introduced. And NPC-2 may improve the efficiency effectively by using body bias control to make the voltage of the body vary according to the higher one of the drain and the source. NPC-3 uses a high voltage clock generator configured in front of the last stage to provide high voltage at the last stage. However, the body effect which increases Vth is still unavoidable.

To solve the problem of Vth, the four phase clock scheme is introduced to increase the $\Delta V$ (voltage gain) by exceeding the Vgate of $M_p$ (power transistor) more than HV path, therefore the gain degradation due to Vth can be alleviated.

However, for periodical clock distribution network such as embedded memories and CPC, the digital clocks switch simultaneously on the clock edge. The drivers of clock switch from low to high level produce the DC short current and more power consumption, thus the larger current peaks on the power supply lines would result in the voltage fluctuations due to the combined effect of the current variation rate within the given time (di/dt) with package inductance (L) and current-resistance (IR) voltage drop. The voltage fluctuation on the supply and ground rails are called GB (Ground Bounce), $\Delta I$ noise, or SSN (simultaneous switching noise). In general, the largest GB occurs in high voltage generator as CPC for embedded non-volatile memories such as Flash memory, OTP and EEPROM for a periodical clock phase control scheme. On-chip CPC with self-clock generator control produces high output voltage higher than the supply voltage and load current with limited efficiency less than 60% in recent work. Therefore the power consumption is quite large than other operating circuits and plays an important role in the power line network. Additionally, a four phase CPC uses complicated timing control scheme and suffers from the limitation of operation frequency because of every sensitive and serious period of timing.

Therefore, there are still some problems which have to be solved in the four phase clock scheme.

SUMMARY

The present invention generally relates to a charge pump, and especially to a charge pump with low noise and high output current and voltage.

In order to solve the problems mentioned above, the present invention discloses a charge pump system with low noise and high output current and voltage, which comprises: a four phase clock generator used to generate a first signals group including a first signal, a second signal, a third signal and a fourth signal which have different phases respectively; a serial of delay circuits coupled to the four phase clock generator, wherein each of the delay circuits is coupled to a previous delay circuit relative to each of the delay circuits for delaying a signals group received from the previous delay circuit; a first charge pump circuit is coupled to the four phase clock generator and the delay circuits; an output terminal is coupled to the first charge pump circuit; wherein high level of said first signal overlaps two sections of high level of said third signal to generate a first overlapping time and a second overlapping time, and said first overlapping time is not equal to said second overlapping time In another aspect, the present invention discloses a four phase clock system for a charge pump with low noise and high output current and voltage, which includes a four phase clock generator used to generate a first signals group including a first signal, a second signal, a third signal and a fourth signal, which have different phases respectively; and a plurality of delay circuits coupled to the four phase clock generator, wherein the plurality of delay circuits are serially connected to generate a plurality of signals groups.

In the other aspect, the present invention discloses a four phase clock generator for a charge with low noise, which includes: a power supply; an oscillator coupled to the power supply; a phase generator coupled to the oscillator; a first delay circuit and a first inverter coupled to the phase generator; a second delay circuit and a second inverter coupled to the first delay circuit; a third delay circuit and a third inverter coupled to the second delay circuit; a fourth inverter coupled to the third delay circuit; a first logic gate circuit coupled to the second inverter and the third inverter, and generating a first signal; a second logic gate circuit coupled to the phase generator and the third delay circuit, and generating a second signal; a third logic gate circuit coupled to the first delay circuit and the second delay circuit, and generating a third signal; and a fourth logic gate circuit coupled to the first inverter and the fourth inverter, and generating a fourth signal.

BRIEF DESCRIPTION OF THE DRAWINGS

FIG. 3a shows an embodiment of the delay circuit of the present invention.

FIG. 3b shows an embodiment of the delay circuit of the present invention.

DETAILED DESCRIPTION

Some sample embodiments of the invention will now be described in greater detail. Nevertheless, it should be recognized that the present invention can be practiced in a wide range of other embodiments besides those explicitly described, and the scope of the present invention is expressly not limited expect as specified in the accompanying claims.

The present invention generally relates to a charge pump with low noise and high output current and voltage which can be introduced to an embedded nonvolatile memory.

Figure 1:
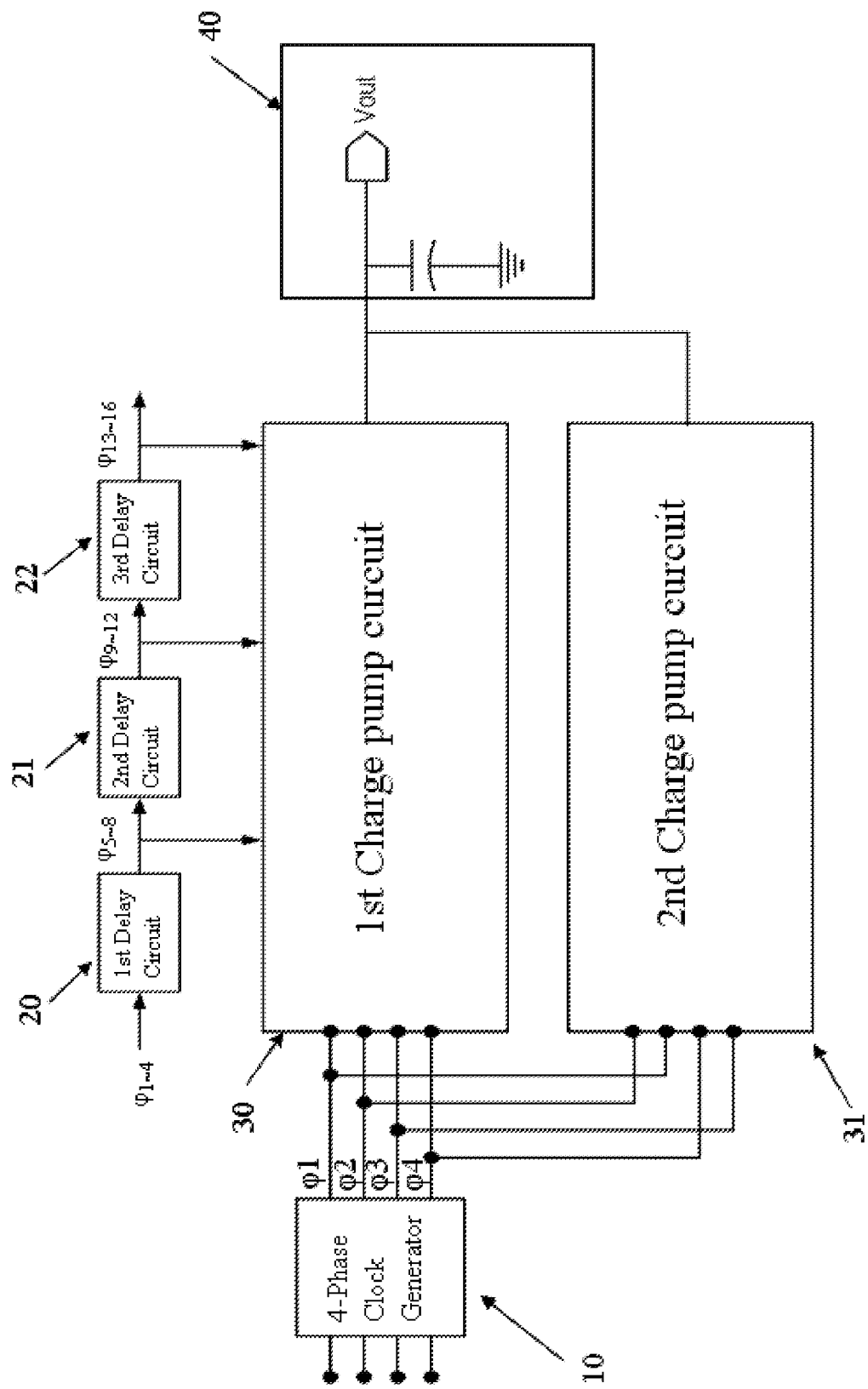
FIG. 1 shows an embodiment of the charge pump system of the present invention.

In a preferred embodiment of the present invention, as shown in FIG. 1, the present invention discloses a charge pump system including a four phase clock generator 10 used to generate a first signal group including a first signal ϕ, a second signal ϕ2, a third signal ϕ3, and a fourth signal ϕ4, which has different phases respectively. A first delay circuit 20 is coupled to the four phase clock generator 10 to delay the first signal group for a pre-determined delay time to a second signal group including a fifth signal ϕ5, a sixth signal ϕ6, a seventh signal ϕ7, and an eighth signal ϕ8.

A second delay circuit 21 is coupled to the first delay circuit 20 to delay the second signal group for the a pre-determined delay time to a third signal group including a ninth signal ϕ9, a tenth signal ϕ10, an eleventh signal ϕ11, and a twelfth signal ϕ12. Similarly, the third delay circuit 22 is coupled to the second delay circuit 21 to delay the third signal group to a fourth signal group including a thirteenth signal ϕ13, a fourteenth signal ϕ14, a fifteenth signal ϕ15, and a sixteen signal ϕ16. A first charge pump circuit 30 is next coupled to the four phase clock generator 10, and the first delay circuit 20, the second delay circuit 21 and the third delay circuit 22 are also respectively coupled to the first charge pump circuit 30.

Therefore, the sequence of signals input to the first charge pump circuit 30 is the first signal ϕ1, the second signal ϕ2, the third signal ϕ3, the fourth signal ϕ4, the fifth signal ϕ5, the sixth signal ϕ6, the seventh signal ϕ7, the eighth signal ϕ8, the ninth signal ϕ9, the tenth signal ϕ10, the eleventh signal ϕ11, the twelfth signal ϕ12, the thirteenth signal ϕ13, the fourteenth signal ϕ14, the fifteenth signal ϕ15, and the sixteen signal ϕ16, sequentially. A second charge pump circuit 31 is subsequently coupled to the four phase clock generator 10, and the first delay circuit 20, the second delay circuit 21 and the third delay circuit 22 are respectively coupled to the first charge pump circuit 30 as well.

The sequence of signals input to the second charge pump circuit 31 is the second signal ϕ2, the first signal ϕ1, the fourth signal ϕ4, the third signal ϕ3, the sixth signal ϕ6, the fifth signal ϕ5, the eighth signal ϕ8, the seventh signal ϕ7, the tenth signal ϕ10, the ninth signal ϕ9, the twelfth signal ϕ12, the eleventh signal ϕ11, the fourteenth signal ϕ14, the thirteenth signal ϕ13, the sixteenth signal ϕ16, and the fifteenth signal ϕ15 sequentially An output terminal 40 is subsequently coupled to the first charge pump circuit 30 and the second charge pump circuit 31. A first overlapping time is presented between which the first signal ϕ1 turns from a low level to a high level and which the third signal ϕ3 turns from a high level to a low level, and a second overlapping time is presented between which the third signal ϕ3 turns from a low level to a high level and which the first signal ϕ1 turns from a high level to a low level, wherein the first overlapping time is longer than the second overlapping time, and the delay time is the first overlapping time minus the second overlapping time.

In the preferred embodiment, the first signals group is generated by the four phase clock generator 10 and is output to the first charge pump circuit 30, the second charge pump circuit 31, and the first delay circuit 20. Then, the second signals group is generated by delaying the first signals group in the first delay circuit 20 and is output to the first charge pump circuit 30, the second charge pump circuit 31, and the second delay circuit 21. Then, the third signals group is generated by delaying the second signals group in the second delay circuit 21 and is output to the first charge pump circuit 30, the second charge pump circuit 31, and the third delay circuit 22, followed by the fourth signals group is generated by delaying the third signals group in the third delay circuit 22 and is output to the first charge pump circuit 30, the second charge pump circuit 31.

Figure 2:
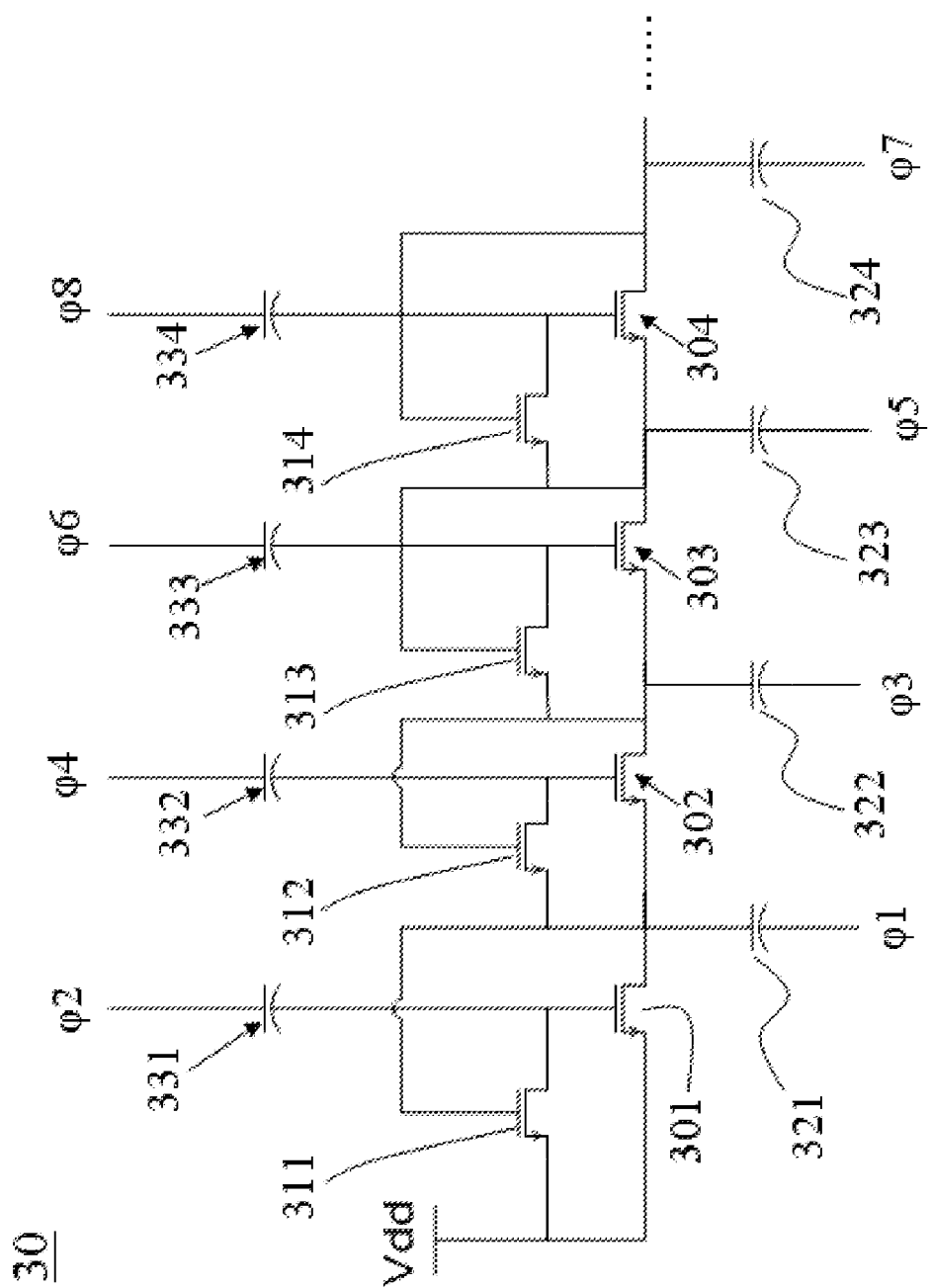
FIG. 2 shows an embodiment of the charge pump circuit of the present invention.

An embodiment of the first charge pump circuit 30 is described in FIG. 2, which includes a plurality of power transistors, such as $M_{p1}$ (power transistor) 301, $M_{p2}$ 302, $M_{p3}$ 303 and $M_{p4}$ 304, and a plurality of gate-control transistors, such as $M_{G1}$ 311, $M_{G2}$ 312, $M_{G3}$ 313 and $M_{G4}$ 314, and a plurality of charge-transfer capacitors, such as $C_{c1}$ (charge-transfer capacitor) 321, $C_{c2}$ 322, $C_{c3}$ 323 and $C_{c4}$ 324, and a plurality of gate-boost capacitors, such as $C_{G1}$ (gate-boost capacitor) 331, $C_{G2}$ 332, $C_{G3}$ 333 and $C_{G4}$ 334. And $C_{c1}$ 321 is input by the first signal ϕ1, and $C_{c2}$ 322 is input by the third signal ϕ3, $C_{c3}$ 323 is input by the fifth signal ϕ5, and $C_{c4}$ 324 is input by the seventh signal ϕ7, and $C_{G1}$ 331 is input by the second signal ϕ2, and $C_{G2}$ 332 is input by the fourth signal ϕ4, and $C_{G3}$ 333 is input by the sixth signal ϕ6, and $C_{G4}$ 334 is input by the eighth signal ϕ8.

In the embodiment, gate-control transistor ($M_G$) transfers Vsource (source voltage) of $M_p$ (Power transistor) to Vgate (gate voltage), and the capacity of the charge-transfer capacitor ($C_c$) is much larger than the one of the gate-boost capacitor ($C_G$) in order to equalize the charge on source node and gate node immediately. For each charge-transfer block, it is obviously observed that three of 4-phase each stage is required when charge is pumped from left to right (low to high). Additionally, odd signals, for instance, the first signal ϕ1, the third signal ϕ3, the fifth signal ϕ5, and the seventh signal ϕ7 are used for pumping charge to next stage, and even signals, for instance, the second signal ϕ2 and the fourth signal ϕ4 and the sixth signal ϕ6 and the eighth signal ϕ8 are used for boosting the Vgate of $M_p$ during charge transferring.

An embodiment of the second charge pump circuit 31 is similar to the first charge pump circuit 30, and the differences is that $C_{c1}$ 321 is input by the second signal φ2, and $C_{c2}$ 322 is input by the fourth signal φ4, $C_{c3}$ 323 is input by the sixth signal φ6, and $C_{c4}$ 324 is input by the eighth signal φ8, and $C_{G1}$ 331 is input by the first signal φ1, and $C_{G2}$ 332 is input by the third signal φ3, and $C_{G3}$ 333 is input by the fifth signal φ5, and $C_{G4}$ 334 is input by the seventh signal φ7. Signals input the second charge pump circuit are in stagger with the signals input the first charge pump circuit, thus, the pumping stage of the second charge pump will not be presented when the pumping stage of the first charge pump is presented, and the pumping stage of the first charge pump will not be presented when the pumping stage of the second charge pump is presented, followed by the output current and voltage will be improved effectively.

In an embodiment of the present invention, the delay circuit including the first delay circuit 20, the second delay circuit 21, and the third delay circuit 22 may include pluralities of inverters, such as two inverters 201 to process the means of delay, and two skewed inverters are preferred, as shown in FIG. 3a. In another embodiment, the same delay time can be implemented by the delay circuit, such as the first delay circuit 20, the second delay circuit 21, and the third delay circuit 22, which includes a buffer 202, a plurality of inverters 20l coupled to the buffer 202, and a driver 203 coupled to the plurality of inverters 201, as shown in FIG. 3b.

Figure 4A:
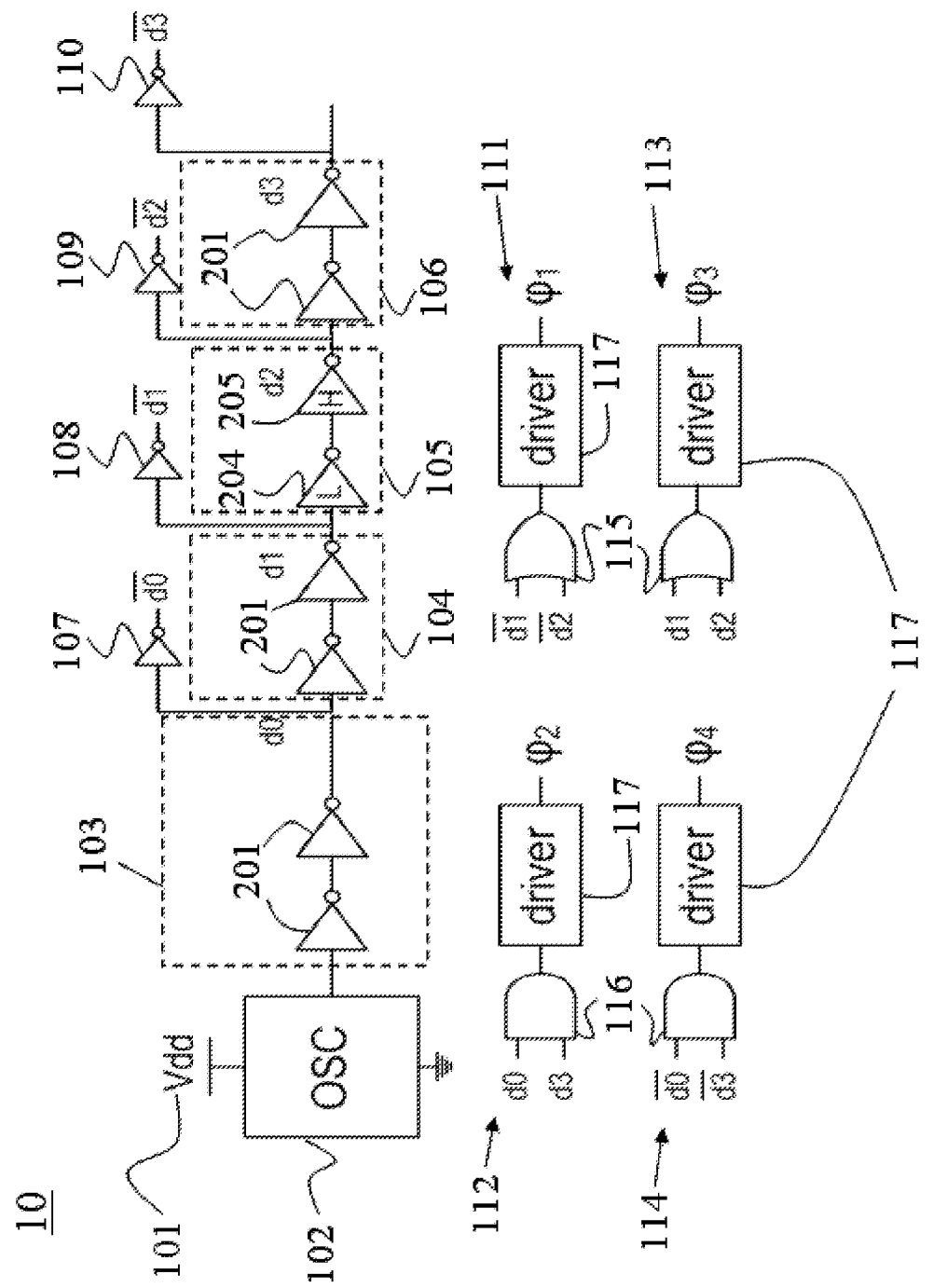
FIG. 4a shows an embodiment of the four phase clock generator of the present invention.

An embodiment of the four phase clock generator 10 disclosed in the present invention is described in FIG. 4a, which includes: a power supply 101, an oscillator 102 coupled to the power supply, a phase generator 103 coupled to the oscillator 102, a first inverter 107 coupled to the phase generator 103, a first delay circuit of the four phase clock generator 104 coupled to the phase generator 103, a second inverter 108 coupled to the first delay circuit of the four phase clock generator 104, a second delay circuit of the four phase clock generator 105 coupled to the first delay circuit of the four phase clock generator 104, a third inverter 109 coupled to the second delay circuit of the four phase clock generator 105, a third delay circuit of the four phase clock generator 106 coupled to the second delay circuit of the four phase clock generator 105, and a fourth inverter 110 coupled to the third delay circuit of the four phase clock generator 106, wherein the phase generator 103 generates signal d0 and the first inverter 107 generates signal d0' which is an inverted signal of d0, and the first delay circuit of the four phase clock generator 104 generates signal d1, and the second inverter 108 generates signal d1' which is an inverted signal of d1, and similarly, the second delay circuit of the four phase clock generator 105 generates signal d2, and the third inverter 109 generates signal d2' which is an inverted signal of d2, and under the same mechanism, the third delay circuit of the four phase clock generator 106 generates signal d3, and the fourth inverter 110 generates signal d3' which is an inverted signal of d3.

Additionally, the four phase clock generator 10 further comprises a first logic gate circuit 111 coupled to the second inverter 108 and the third inverter 109 and input by the signal d1' and the signal d2', followed by generating a first signal; a second logic gate circuit 112 coupled to the phase generator 103 and the third delay circuit 106 and input by the signal d0 and the signal d3, followed by generating a second signal; a third logic gate circuit 113 coupled to the first delay circuit 104 and the third delay circuit 106 and input by the signal d1 and the signal d2, followed by generating a third signal; a fourth logic gate circuit 114 coupled to the first inverter 107 and the fourth inverter 110 and input by the signal d0' and the signal d3', followed by generating a fourth signal.

Figure 5:
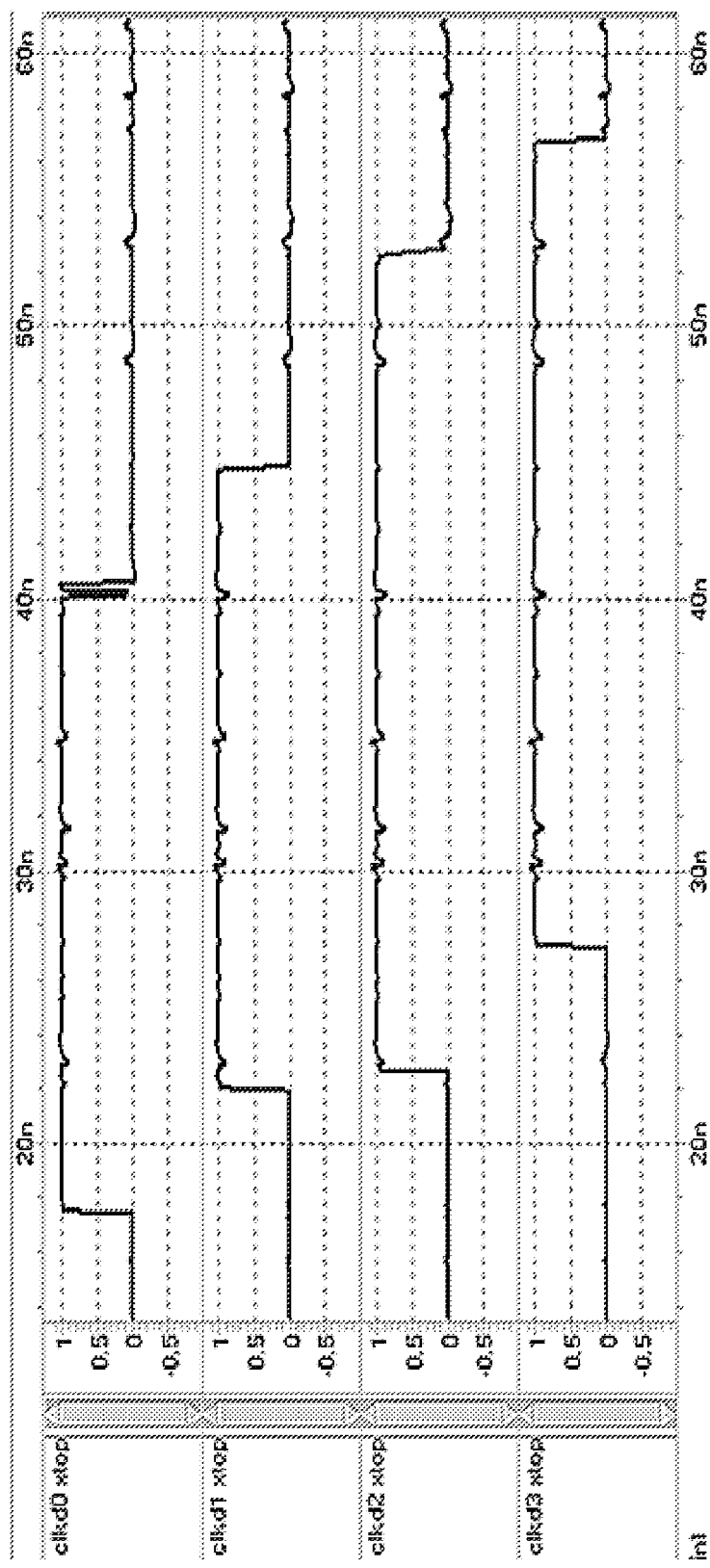
FIG. 5 shows the diagram of the signal d0,d1,d2,d3.

In the embodiment, two inverters 201 are used to generate signal d0 with a particular clock in the phase generator 103, and two inverters 201 are used to delay the signal d0 to activate the signal d1 in the first delay circuit of the four phase clock generator 104. A pair of inverters including a Hi-skewed inverter 205 and a Lo-skewed inverter 204 is used to make the signal d2 rise swiftly, and slowly drop from the signal d1 in the second delay circuit of the four phase clock generator 105 such that the four phase clock scheme may be optimized, and the two inverters 201 are used to delay the signal d2 to be the signal d3 in the third delay circuit of the four phase clock generator 106. The diagram of the aforementioned signal d0, d1, d2, d3 is shown in FIG. 5. Furthermore, an OR gate 115 and a driver 117 are used to integrate the signal d1' and the signal d2' to be the first signal φ1 in the first logic gate circuit 111, and an AND gate 116 and a driver 117 are used to integrated the signal d0 and the signal d3 to be the second signal φ2 in the second logic gate circuit 112. An OR gate 115 and a driver 117 are used to integrate the signal d1 and the signal d2 to be the third signal φ3 in the third logic gate circuit 113. Similarly, an AND gate 116 and a driver 117 are used to integrated the signal d0' and the signal d3' to act the fourth signal φ4 in the fourth logic gate circuit 114.

Figure 4B:
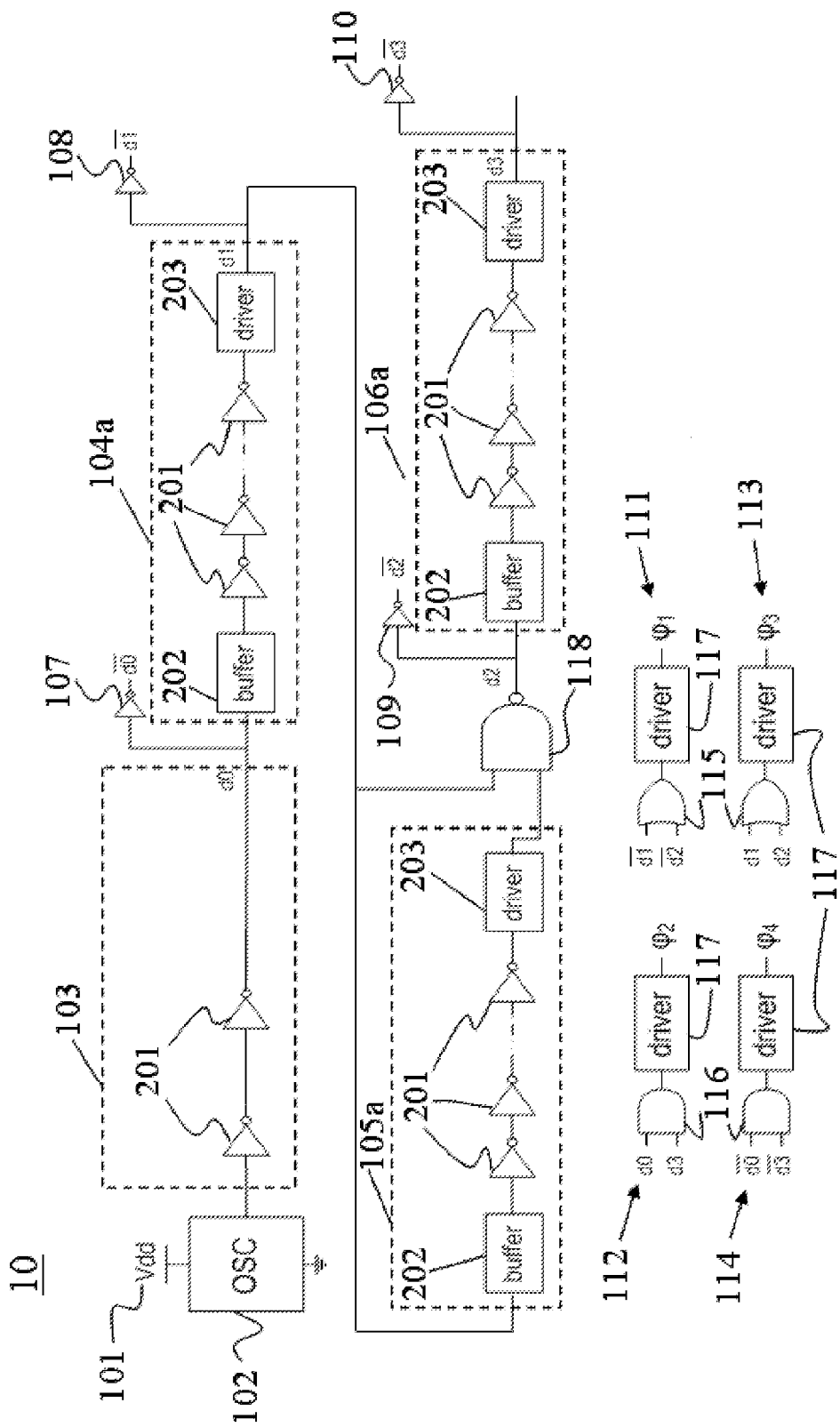
FIG. 4b shows an embodiment of the four phase clock generator of the present invention.

Another embodiment of the four phase clock generator 10 disclosed in the present invention is described in FIG. 4b, which is similar to the four phase clock generator shown in FIG. 4a. The difference between them is that the delay circuit, such as the first delay circuit 104a, the second delay circuit 105a, and the third delay circuit 106a, of the four phase clock generator 10 in the embodiment includes a buffer 202, a plurality of inverters 201 coupled to the buffer 202, and a driver 203 coupled to the plurality of inverters 202. The input to next delay circuit is modified by adding pre-gate-drivers, and each pre-gate driver becomes the output loading of previous delay circuit. Thus, the same delay time can be implemented by the same delay circuit. And an NAND gate 118 which is input by the first delay circuit 104a and the second delay circuit 105a and coupled to the third delay circuit 106a is introduced in the embodiment to target the first rising edge and last falling edge to achieve the timing waveform of the signal d2, which is the function of the LO-skewed inverter 205 and the HI-skewed inverter 205 of the second delay circuit shown in FIG. 4a.

In an embodiment of the present invention, a four phase clock generator for a charge pump is disclosed, which includes: a four phase clock generator which is used to generate a first signals group including a first signal, a second signal, a third signal, and a fourth signal, which has different phases respectively, a plurality of delay circuits coupled to the four phase clock generator, wherein each delay circuit is coupled to a previous delay circuit and delays the previous signals group for a delay time to generate a plurality of signals groups, such that the peak current will be reduced and Ground Bounce and simultaneous switching noise (SSN) will be alleviated.

Figure 6:
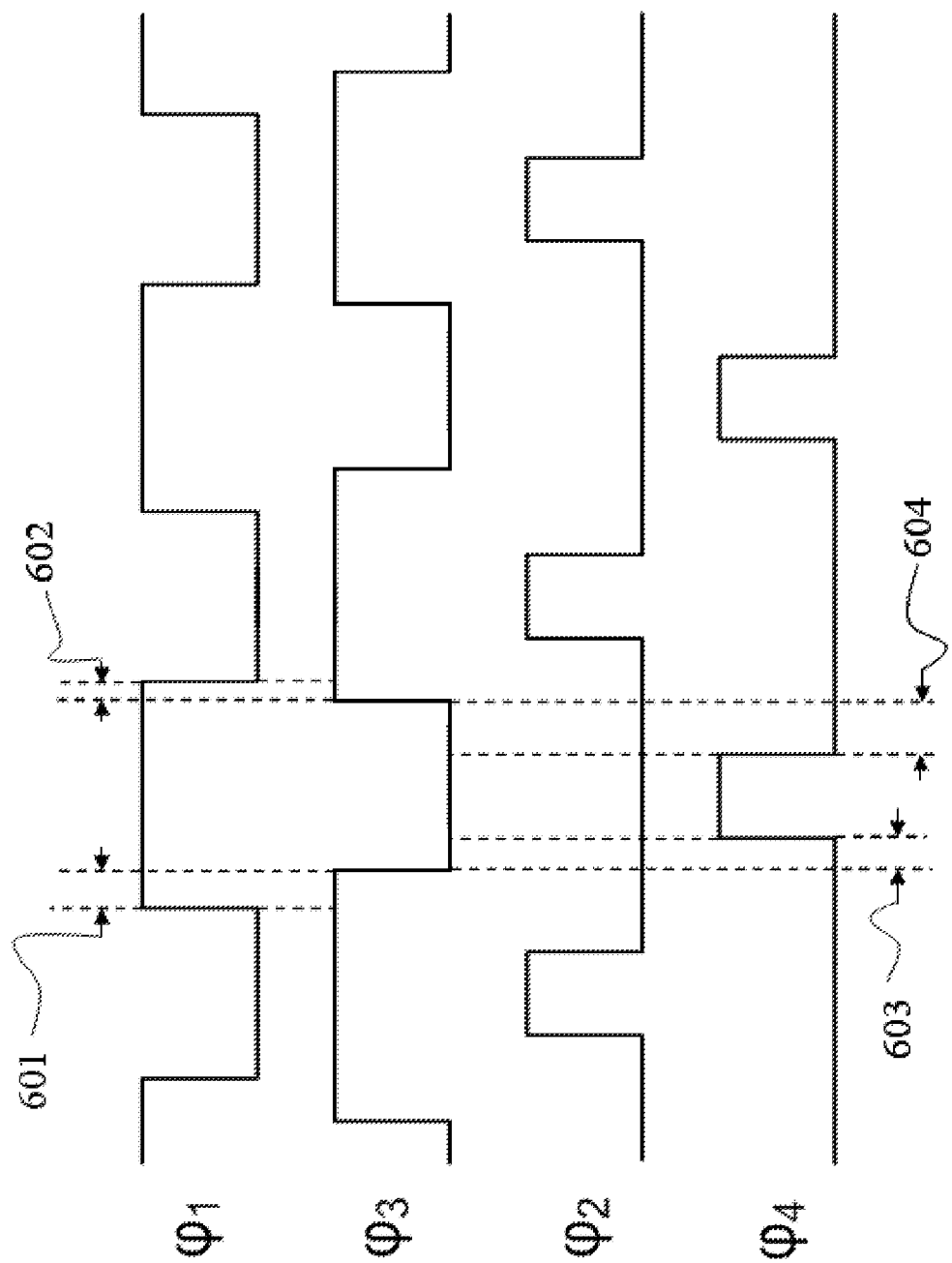
FIG. 6 shows the diagram of the signal ϕ1, ϕ2, ϕ3, ϕ4.

In another aspect of the present invention, a four phase scheme is disclosed as shown in FIG. 6. A first overlapping time 601 is presented between which the first signal φ1 turns from a low level to a high level and which the third signal φ3 turns from a high level to a low level. A second overlapping time 602 is presented between which the third signal φ3 turns from a low level to a high level and which the first signal φ1 turns from a high level to a low level. From the same illustration, it is observed that a first margin time 603 is presented between which the third signal φ3 turns from a high level to a low level and which the fourth signal φ4 turns from a low level to a high level so as to prevent reversed charge sharing.

Figure 7:
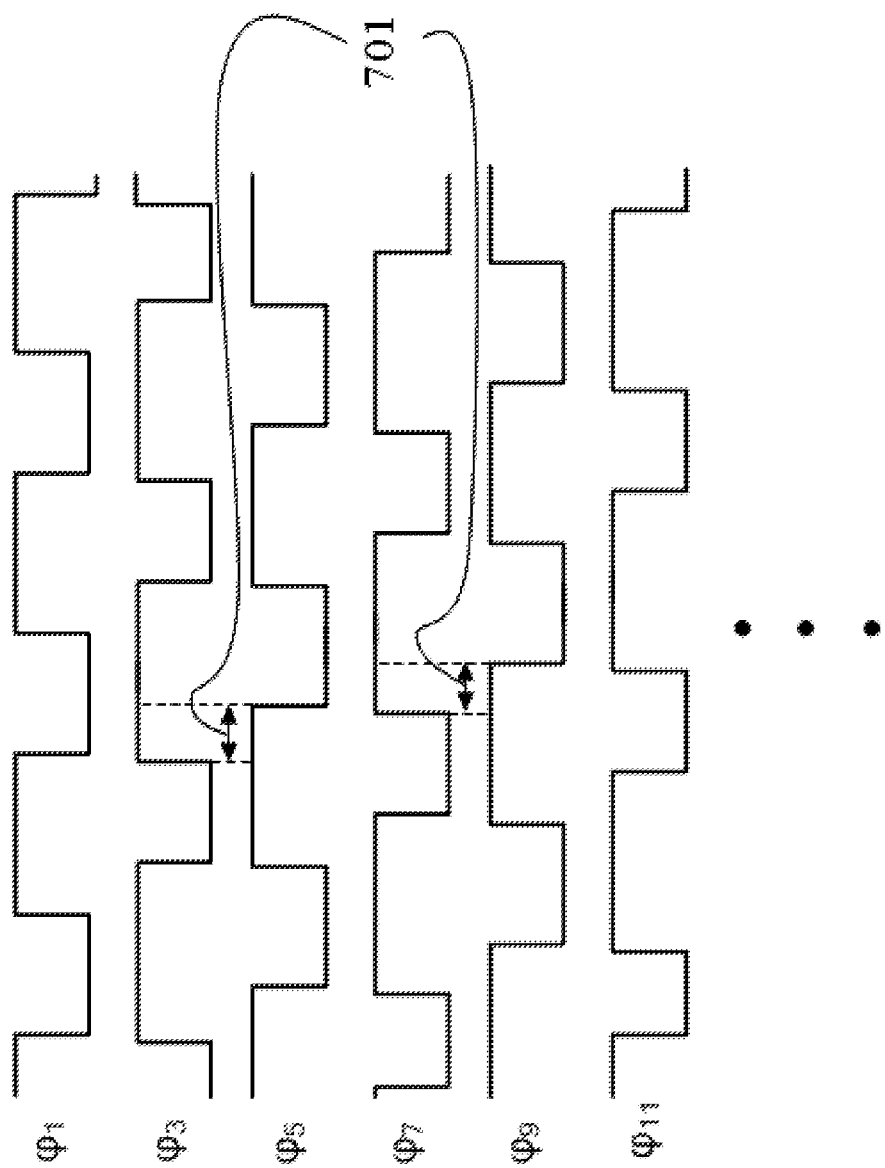
FIG. 7 shows the diagram of the signal ϕ1, ϕ3, ϕ5, ϕ7, ϕ9, ϕ11.

Similarly, a second margin time 604 is present between which the fourth signal φ4 turns from a high level to a low level and which the third signal φ3 turns from a low level to a high level so as to prevent reversed charge sharing as well. Especially, the first overlapping time 601 can be longer than the second overlapping time 603 because the Vgate of $M_p$ is just dependent on the first overlapping time 601 due to the delay circuit. Additionally, if the delay time 601 is too less, it will not reduce the peak current effectively. Furthermore, if the delay time 701 is too long, it will make the four phase scheme fail, followed by causing reversed charge sharing, therefore, the optimized delay time 701 is designed as the first overlapping time 601 minus the second overlapping time 602, as shown in FIG. 7.

One advantage of the present invention is that the peak current will be reduced because of the delay circuit, followed by the ground bounce and the simultaneous switching noise caused by the peak current may be alleviated.

Another advantage of the present invention is that the operation frequency may be improved because the second overlapping time can be decreased and the width of phase may be reduced.

The other advantage of the present invention is that the output current and voltage can be improved because two charge pump circuit are introduced to use the delayed signals in stagger.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A charge pump system with low noise and high output current and voltage, comprising:
    a four phase clock generator used to generate a first signals group including a first signal, a second signal, a third signal and a fourth signal which have different phases respectively;
    a serial of delay circuits coupled to said four phase clock generator, wherein each of said delay circuits is coupled to a previous delay circuit relative to each of said delay circuits for delaying a signals group received from said previous delay circuit;
    a first charge pump circuit coupled to said four phase clock generator and said delay circuits; and
    an output terminal coupled to said first charge pump circuit;
    wherein high level of said first signal overlaps two sections of high level of said third signal to generate a first overlapping time and a second overlapping time, and said first overlapping time is not equal to said second overlapping time.

2. The system according to claim 1, wherein said first overlapping time is greater than said second overlapping time.

3. The system according to claim 1, further comprises a second charge pump circuit coupled to said four phase clock generator and said delay circuits.

4. The system according to claim 1, wherein each of said delay circuits includes two inverters.

5. The system according to claim 1, wherein each of said delay circuits includes a buffer, a plurality of inverters coupled to said buffer, and a driver coupled to said plurality of inverters.

6. A four phase clock system for a charge pump with low noise and high output current and voltage, comprising:
    a four phase clock generator used to generate a first signals group including a first signal, a second signal, a third signal and a fourth signal, which have different phases respectively; and
    a plurality of delay circuits coupled to said four phase clock generator, wherein said plurality of delay circuits are serially connected to generate a plurality of signals groups;
    wherein high level of said first signal overlaps two sections of high level of said third signal to generate a first overlapping time and a second overlapping time, and said first overlapping time is not equal to said second overlapping time.

7. The system according to claim 6, wherein said first overlapping time is greater than said second overlapping time.

8. The system according to claim 6, wherein each of said delay circuits includes two inverters.

9. The system according to claim 6, wherein each of said delay circuits includes a buffer, a plurality of inverters coupled to said buffer, and a driver coupled to said plurality of inverters.

10. A four phase clock generator for a charge pump with low noise and high output current and voltage, comprising:
    a power supply;
    an oscillator coupled to said power supply;
    a phase generator coupled to said oscillator;
    a first delay circuit and a first inverter coupled to said phase generator;
    a second delay circuit and a second inverter coupled to said first delay circuit;
    a third delay circuit and a third inverter coupled to said second delay circuit;
    a fourth inverter coupled to said third delay circuit;

a first logic gate circuit coupled to said second inverter and said third inverter, and generating a first signal;

a second logic gate circuit coupled to said phase generator and said third delay circuit, and generating a second signal;

a third logic gate circuit coupled to said first delay circuit and said second delay circuit, and generating a third signal; and a fourth logic gate circuit coupled to said first inverter and said fourth inverter, and generating a fourth signal.

11. The four phase clock generator according to claim 10, wherein said phase generator includes two inverters.

12. The four phase clock generator according to claim 10, wherein said first delay circuit and said third delay circuit include two inverters respectively.

13. The four phase clock generator according to claim 12, wherein said second delay circuit includes a LO-skewed inverter and a HI-skewed inverter.

14. The four phase clock generator according to claim 10, wherein said first delay circuit and said second delay circuit and said third delay circuit include a buffer, a plurality of inverters coupled to said buffer, and a driver coupled to said plurality of inverters respectively.

15. The four phase clock generator according to claim 14, further comprising a NAND gate input by said first delay circuit and said second delay circuit and coupled to third delay circuit.

16. The four phase clock generator according to claim 10, wherein said first logic gate circuit includes an OR gate and a driver coupled to said OR gate to generate said first signal.

17. The four phase clock generator according to claim 10, wherein said second logic gate circuit includes an AND gate and a driver coupled to said AND gate to generate said second signal.

18. The four phase clock generator according to claim 10, wherein said third logic gate circuit includes an OR gate and a driver coupled to said OR gate to generate said third signal.

19. The four phase clock generator according to claim 10, wherein said fourth logic gate circuit includes an AND gate and a driver coupled to said AND gate to generate said fourth signal.

20. A charge pump system with low noise and high output current and voltage, which includes a four phase clock generator to generate a first signals group including a first signal, a second signal, a third signal and a fourth signal which have different phases respectively, characterized in that high level of said first signal overlaps two sections of high level of said third signal to generate a first overlapping time and a second overlapping time, and said first overlapping time is not equal to said second overlapping time.

* * * * *